Figure 1:
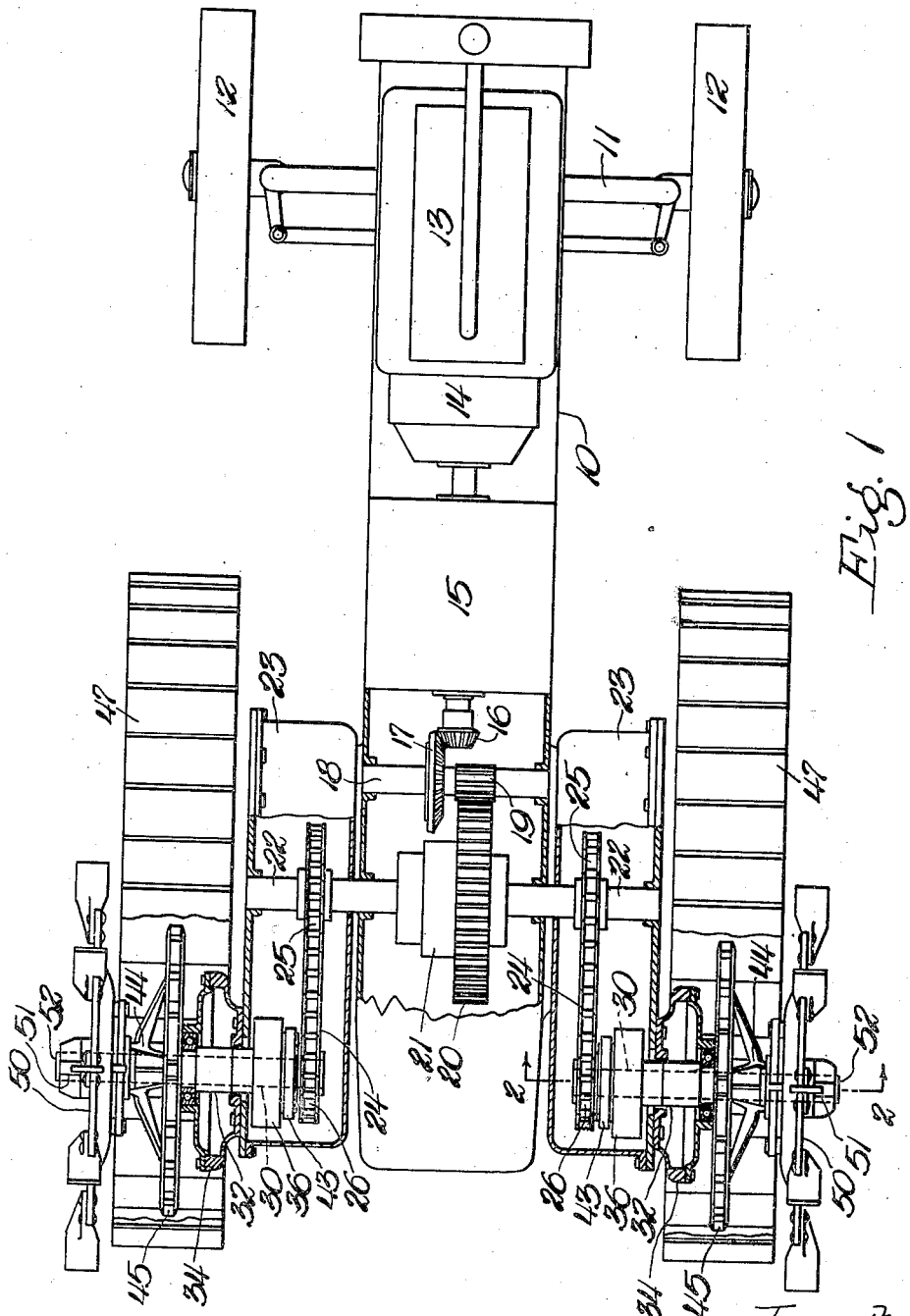

Aug. 16, 1938.  E. A. JOHNSTON  2,127,033
CRAWLER TRACTOR
Filed June 29, 1936  2 Sheets-Sheet 2

Inventor
E. A. Johnston
By V. F. Lassague
Atty.

Patented Aug. 16, 1938

2,127,033

UNITED STATES PATENT OFFICE 2,127,033

CRAWLER TRACTOR

Edward A. Johnston, Chicago, Ill., assignor to International Harvester Company, a corporation of New Jersey Application June 29, 1936, Serial No. 87,888

10 Claims. (Cl. 180—9.1)

This invention relates to tractors.

The big problem in the design of a tractor is to provide the same with traction supports that will not slip, so that as much torque as possible delivered from the engine to the traction devices can be utilized in the working effort of the tractor. Slippage of the traction devices on varying ground conditions over which the tractor moves makes it most difficult to attain the most efficient use of engine torque in all conditions, since much of the torque is dissipated when slippage of the traction devices occurs.

In crawler and semicrawler tractors the problem of slippage is generally overcome because of the broad area of contact of the traction devices with the ground, but, even with the use of these crawler devices, slippage does occur in some conditions, causing waste of engine torque. In tractors of the semicrawler type it has been proposed in the past, as in applicant's copending application Serial No. 755,699, filed December 3, 1934, now Patent No. 2,092,607 issued Sept. 7, 1937, for Semicrawler tractor, to provide each crawler device with an auxiliary spade lug wheel, so that tractive effort would be increased. In other words, it is a highly important problem in the design of a tractor to insure that it be efficiently "geared to the ground".

The main object of this invention is to provide a tractor of the type utilizing dual traction means on each side thereof, such as a crawler device and an auxiliary spade lug wheel, in combination with means for automatically delivering engine torque to that traction device of each dual unit, which, in accordance with ground conditions, is capable of utilizing the torque.

Another object is to provide in a tractor of the type indicated a torque compensating device for delivering torque to either one of two traction devices on the same side of the tractor which happens to need the torque, depending upon ground resistance or traction conditions.

Another object is generally to improve tractors, so that they will efficiently operate without loss of traction.

In the illustrative embodiment of the invention to be herein disclosed, the tractor shown is of the semicrawler type having on each side a semicrawler track, and each track having mounted at its outer side a spade lug wheel, so that each traction unit on each side of the tractor is composed of a crawler belt and a spade lug wheel. The tractor carries an engine which transmits torque through a conventional change speed gear set to drive a conventional, rear axle differential, the jack shafts of which are respectively keyed to drive stub axles, which in turn respectively carry and drive the said spade lug wheels. A torque compensator is provided for each traction unit at each side of the tractor, which compensator is so constructed that, in the event that the spade lug wheel has no traction, the torque thus dissipated in slippage will be automatically transferred to the adjacent crawler belt to continue tractive movement of the tractor without waste of engine power. By means of such torque converter, the tractor is caused to move evenly and continuously without loss of engine power, the converter serving to distribute the torque to either the crawler device or back to the spade lug wheel in each traction unit, depending upon which of the two, in accordance with ground resistance conditions, is capable of utilizing the engine torque.

Figure 2:
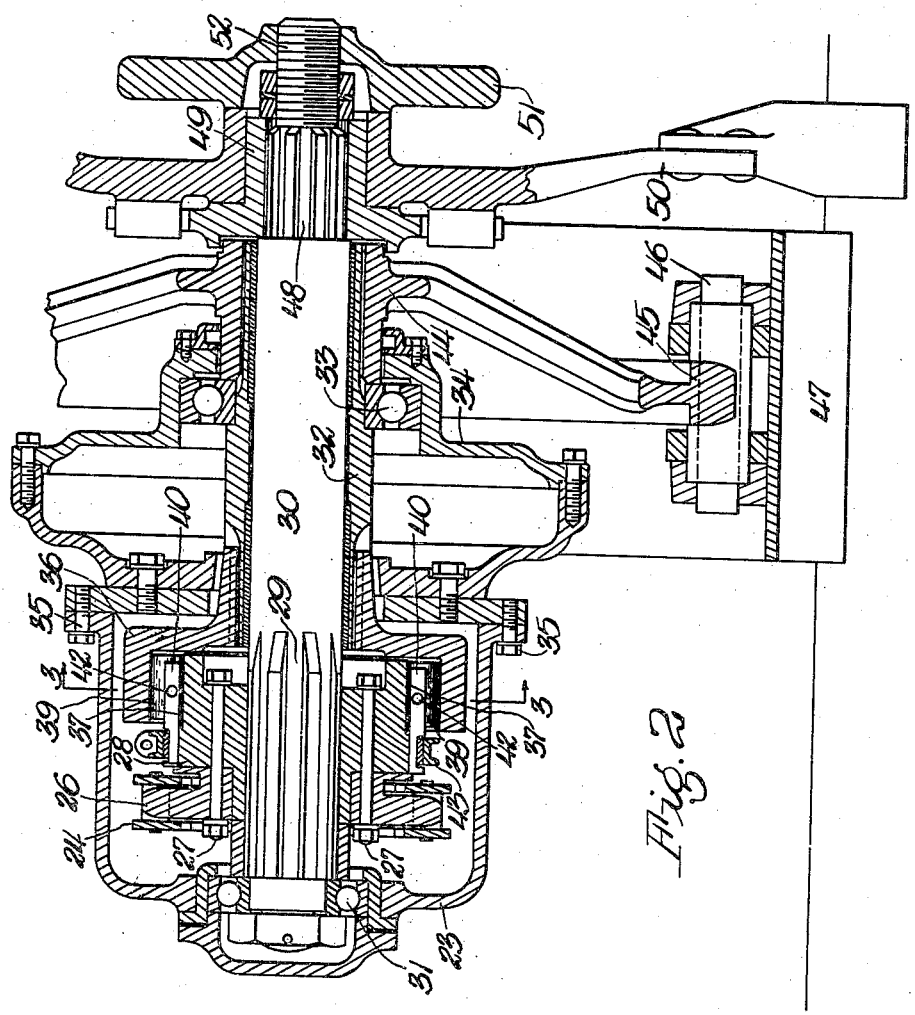
Figure 3:
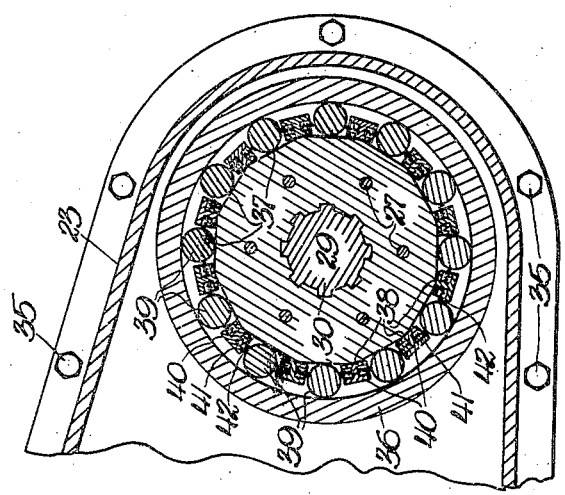

In the accompanying sheets of drawings illustrating the invention,

Figure 1 is a general plan view of the improved tractor with portions of the housings broken away to illustrate the interior mechanism;

Figure 2 is a vertical, transverse sectional view on an enlarged scale, taken along the line 2—2 of Figure 1, looking in the direction of the arrows, and illustrating the torque converter and its connections from the driving source to the driven traction elements; and, Figure 3 is a detail sectional view through the compensator or converter, taken along the line 3—3 of Figure 2, looking in the direction of the arrows.

For the sake of illustration, the tractor shown may be of the type illustrated in my previously mentioned copending patent application, the same embodying a longitudinal main frame 10 supported at its front end on an axle structure 11 and front steering wheels 12. The front end of the frame carries a motor 13 which, in the conventional manner, delivers torque through a conventional clutch 14 into a change speed gear transmission 15 at the rear thereof.

This transmission, which is of the usual construction, includes a final power output, bevel pinion 16 meshing with and driving a bevel gear wheel 17 carried on a counter-shaft 18 disposed transversely and journaled in the frame 10 of the tractor, as shown in Figure 1. The shaft 18 turns a spur gear pinion 19, which in turn meshes with and drives a large spur gear 20, which is the bull gear, for a conventional automobile type of differential 21, which includes the two oppositely extending jack shafts 22 journaled in the body 10 and auxiliary housings 23 in any desirable manner; for instance, as illustrated in my previously mentioned patent application.

These side housings 23 are connected in any desired manner to the opposite sides of the tractor body 10 at its rear. Within these housings, respectively, is located a rearwardly extending drive chain 24 driven from a sprocket wheel 25 turning with the respective differential jack shafts 22, said chains 24 at their rear ends serving to drive sprocket wheels 26, which, as shown in Figure 2, are secured by means of bolts 27 to a collar 28, which in turn is connected by a spline 29 to a stub axle 30 disposed transversely and carried on appropriate bearings in the housings 23. It will be understood that the mechanism described is duplicated on each side of the tractor and, for that reason, only one side thereof, as depicted in Figure 2, need be described.

The bearing for the inner end of the stub shaft 30 is shown at 31. Surrounding the stub shaft 30 is a quill 32 journaled in a bearing 33 in an auxiliary housing part 34 secured by bolts 35 to the housing part 23. This quill or sleeve 32 at its inner end is secured fixedly by means of a key to an enlarged bell or cup-shaped housing 36, which telescopes over the outer end of the sleeve 28 and in spaced relation therefrom, thus providing an annular space, as shown in Figures 2 and 3, between the outer surface of the hub 28 and the inner surface of the bell housing 36.

As shown in Figure 3, the outer surface of the collar 28, inside the bell-shaped member 36, is provided with alternating flat surfaces 37 separated by high spots 38, and disposed for free turning on their axes on the flat surfaces 37 are cylindrical rollers 39. Between the rollers and normally disposed on the high spots 38 are a series of bars 40, which, inside the bell housing 37 and between the rollers, are on opposite faces provided with a notched out groove 41 serving as recesses for mounting compression springs 42, which act to spread the rollers 39 apart normally in such position, as shown in Figure 3, that the rollers seat on the flat surfaces 37 to permit them to turn freely without transmitting torque from the hub or sleeve 28 to the bell-shaped member 36, and, consequently, under normal conditions, the quill 32 is not driven. The bars 40 are locked in position by a clamp ring 43 to the inner edge of the outer surface of the collar 28 between the sprocket wheel 26 and the bell-shaped member 36.

Splined to the outer end of the quill or sleeve 32 is the hub 44 of a driving sprocket wheel 45, the teeth of which are adapted to engage the pintles 46 of the shoes or links comprising an endless semicrawler track belt 47, the front end of which is supported on an idler wheel, not shown, as described in the previously mentioned copending patent application. The outer end of the shaft 30 is splined at 48 to carry for rotation therewith a spider hub 49, to which is clutched for turning movement therewith a spade lug wheel 50, which has a greater diameter than the diameter of the adjacent track driving sprocket wheel 45. The spade lug wheel 50 is firmly locked in place to turn with shaft 30 by means of a clamp fixture 51 threaded to the reduced, screw threaded end 52 of shaft 30 outwardly of its spline 48. This completes the description of the parts, and a summary of the mode of operation of the organization will now be described.

The engine 13 delivers torque through the clutch 14, transmission 15, and finally to the bevel pinion 16, which in turn, through gear 17, turns the counter-shaft 18. The shaft 18 turns the gear 19, which operates a conventional automobile type of differential 21 through the bull pinion 20. Consequently, when the machine is traveling straight ahead, the two jack shafts 22 serve, through the sprocket wheel 25, to transmit engine power by means of the respective chains 24 inside the housings 23 to drive, respectively, the sprocket wheels 26. Thus, torque is delivered by the sprocket wheel 26 to the sleeve or collar 28, which in turn, since it is keyed to the shaft 30, turns the shaft 30 and carries with it the spade lug wheel 50. If the two spade lug wheels 50 are receiving ample resistance from the ground, the tractor rolls ahead on traction provided by said spade lug wheels alone and the crawler tracks 47 are merely dragged along or roll idly without receiving torque from the engine. In other words, in such condition of operation, the tracks 47 are mere ground supports.

Should, however, either one or both of the spade lug wheels 50 not receive sufficient resistance from the ground to develop tractive effort, then such spade lug wheel 50 slips with respect to the ground and is incapable of imparting movement to the tractor; the collar 28 of course, continuing to be turned angularly by engine torque from the sprocket wheel 26, and so it is that the collar 28 is turned in such a manner that the rollers 39 ride up, so to speak, on the high spots 38, whereupon each of the rollers 39 acts as a clutch dog for frictionally gripping the bell-shaped member 36. Thereupon, the quill or sleeve 32 is driven, and with it, of course, is positively turned the driving sprocket wheel 45 for the crawler truck 47. Thus, if both spade lug wheels lose traction, the torque of the engine cannot be dissipated, because it is instantly picked up by the crawler track 47, due to the action of the torque converters described. If only one of the spade lug wheels loses traction, then the proximate crawler track 47 receives the torque. In other words, each dual traction mechanism may function independently of the other, because each is provided with a torque compensator or converter. When the tractor is turned by angling the front wheels 12, the differential 21 comes into play in the conventional manner, so that power lost by one side is instantly multiplied on the other side in direct proportion, so that power is available for delivering torque on steering movement of the tractor. It is obvious, due to the construction of the converter, as illustrated in Figure 3, that it will function in the same manner above described when the tractor is moved in reverse gear.

From this description it will now be appreciated that an improved tractor construction has been provided, which achieves the desirable objects of the invention heretofore recited. It should be understood that it is the intention to cover all changes and modifications of the preferred example of the structure herein shown for the sake of illustration which do not in material respects constitute departures from the spirit and scope of the invention, which is defined hereinafter in the appended claims.

What is claimed is:

1. In a tractor having a longitudinal frame carrying an engine connected to drive a transmission and differential including transverse jack shafts, a traction unit at each side of the tractor comprising dual traction supports for each side of the tractor simultaneously engaging the ground, said supports comprising coaxially mounted wheels, one of which is a driver for a crawler belt and the other of which is a spade lug wheel, the combination therewith of means deriving power from the jack shafts respectively for driving one or the other of said wheels in each unit, said means including a torque converter for automatically delivering engine torque to the one wheel in each unit capable of delivering tractive effort as a result of ground conditions.

2. In a tractor having a longitudinal frame carrying an engine connected to drive a transmission and differential including transverse jack shafts, a traction unit at each side of the tractor comprising dual traction supports for each side of the tractor, said supports comprising coaxially mounted wheels, one of which is a driver for a crawler belt and the other of which is a spade lug wheel, the combination therewith of means deriving power from the jack shafts respectively for driving the spade lug wheel in each unit, and means for automatically transferring the engine torque to drive the other wheel and crawler belt of each unit when the proximate spade lug wheel slips or loses traction.

3. In a tractor having a longitudinal frame carrying an engine, said frame at each side being mounted on final drive traction units, each of which comprises a pair of traction devices including a coaxial drive shaft and quill for respectively mounting the devices, the combination therewith of means delivering engine torque for driving the shaft and one of the devices in a unit, and means for automatically supplying the torque to drive the quill and other device in the same unit when the aforementioned device is incapable of having tractive effort.

4. In a tractor having a longitudinal frame carrying an engine, said frame at each side being mounted on final drive traction units, each of which comprises a pair of traction devices including a coaxial drive shaft and quill for respectively mounting the devices, the combination therewith of means delivering engine torque for driving the shaft and one of the devices in a unit, and means for automatically supplying the torque to drive the quill and other device in the same unit when the aforementioned device is incapable of having tractive effort, said means comprising a torque compensating clutch in each unit interposed respectively between the shaft and quill of each unit.

5. In a tractor having a longitudinal frame carrying an engine, said frame at each side being mounted on final drive traction units each of which includes a pair of coaxial wheels, one of which is a drive sprocket wheel for a crawler belt and the other of which is a spade wheel at the side thereof, said belt and spade wheel simultaneously engaging the ground, each unit further including a coaxial shaft and quill for respectively mounting and driving the wheels in each unit, the combination therewith of means for delivering engine torque through the shaft to the spade wheel in each unit, and means for automatically delivering the torque to the quill in each unit for driving the sprocket wheel when the proximate spade wheel loses traction as a result of ground conditions.

6. In a tractor having a longitudinal frame carrying an engine, said frame at each side being mounted on final drive traction units each of which includes a pair of coaxial wheels, one of which is a drive sprocket wheel for a crawler belt and the other of which is a spade wheel at the side thereof, said belt and spade wheel simultaneously engaging the ground, each unit further including a coaxial shaft and quill for respectively mounting and driving the wheels in each unit, the combination therewith of an automatically acting torque converter interposed between the shaft and quill in each unit for delivering engine torque to whichever of the wheels in each unit is capable of delivering tractive effort as a result of ground conditions.

7. In a tractor having a longitudinal frame carrying an engine, a transmission and a differential including transverse coaxial jack shafts driven from the engine through the transmission, side housings carried by the frame at its rear end, each including a transverse stub-axle carrying a spade lug wheel, a drive connection in each side housing between the respective jack shafts and stub-axles, a quill surrounding each stub-axle and carrying concentrically with the spade lug wheels a drive sprocket wheel for a crawler belt disposed alongside each spade lug wheel and serving as an additional traction support for each side of the tractor, the combination therewith of an overrunning clutch interposed between the stub-axle and quill in each unit whereby torque dissipated in slippage of the spade wheel is automatically delivered to the sprocket wheel to drive the belt.

8. In a tractor having a longitudinal frame carrying an engine, a transmission and a differential including transverse coaxial jack shafts driven from the engine through the transmission, side housings carried by the frame at its rear end, each including a transverse stub-axle carrying a spade lug wheel, a chain and sprocket drive connection in each side housing between the respective jack shafts and stub-axles, a quill surrounding each stub-axle and carrying concentrically with the spade lug wheels a drive sprocket wheel for a crawler belt disposed alongside each spade lug wheel and serving as an additional traction support for each side of the tractor, the combination therewith of a torque compensating clutch interposed between the stub-axle and quill in each unit whereby torque dissipated in slippage of the spade wheel is automatically delivered to the sprocket wheel to drive the belt.

9. In a tractor having a longitudinal frame carrying an engine, a transmission and a differential including transverse coaxial jack shafts driven from the engine through the transmission, side housings carried by the frame at its rear end, each including a transverse stub-axle carrying a spade lug wheel, a chain and sprocket drive connection in each side housing between the respective jack shafts and stub-axles, a quill surrounding each stub-axle and carrying concentrically with the spade lug wheels a drive sprocket wheel for a crawler belt disposed alongside each spade lug wheel and serving as an additional traction support for each side of the tractor, the combination therewith of a collar mounted on the stub-axle in each unit to turn therewith, a bell-shaped member at the end of each quill to turn therewith and arranged to telescope the collar, and an overrunning clutch interposed between the collar and bell member in each unit whereby torque dissipated in slippage of the spade wheel is automatically delivered to the sprocket wheel to drive the belt.

10. In a tractor having a longitudinal frame carrying an engine, a transmission and a differential including transverse coaxial jack shafts driven from the engine through the transmission, side housings carried by the frame at its rear end, each including a transverse stub-axle carrying a spade lug wheel, a drive connection in each side housing between the respective jack shafts and stub-axles, a quill surrounding each stub-axle and carrying concentrically with the spade lug wheels a drive sprocket wheel for a crawler belt disposed alongside each spade lug wheel and serving as an additional traction support for each side of the tractor, the combination therewith of a collar mounted on the stub-axle in each unit to turn therewith, a bell-shaped member at the end of each quill to turn therewith and arranged to telescope the collar, and an overrunning clutch including spring pressed driver elements interposed between the collar and bell member in each unit whereby torque dissipated in slippage of the spade wheel is automatically delivered to the sprocket wheel to drive the belt.

EDWARD A. JOHNSTON.